(12) United States Patent
Ichino

(10) Patent No.: US 7,522,633 B2
(45) Date of Patent: Apr. 21, 2009

(54) TRANSMISSION SYSTEM FOR EFFICIENT TRANSMISSION OF PROTOCOL DATA

(75) Inventor: Kiyohisa Ichino, Minato-ku (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 10/743,375

(22) Filed: Dec. 23, 2003

(65) Prior Publication Data

US 2004/0136401 A1    Jul. 15, 2004

(30) Foreign Application Priority Data

Dec. 25, 2002    (JP) .............................. 2002-374791

(51) Int. Cl.
*H04J 3/07*    (2006.01)
(52) U.S. Cl. ...................... 370/466; 370/401; 370/504
(58) Field of Classification Search ................. 370/466, 370/470, 471, 474, 475, 476
See application file for complete search history.

(56) References Cited

U.S. PATENT DOCUMENTS

| | | | |
|---|---|---|---|
| 4,740,962 A * | 4/1988 | Kish, III ...................... 370/514 |
| 5,757,775 A * | 5/1998 | Yokoyama et al. ........... 370/242 |
| 6,388,994 B1 * | 5/2002 | Murase ........................ 370/235 |
| 6,504,840 B1 * | 1/2003 | Bostrom et al. ............. 370/360 |
| 6,512,747 B1 * | 1/2003 | Umeuchi et al. .......... 370/310.1 |
| 6,731,655 B1 * | 5/2004 | Shuto et al. ................. 370/505 |
| 6,735,195 B1 * | 5/2004 | Mehta ......................... 370/352 |
| 6,804,195 B2 * | 10/2004 | Izumi et al. ................. 370/230 |
| 7,050,455 B2 * | 5/2006 | Nishihara ................... 370/466 |
| 7,065,052 B1 * | 6/2006 | McBride ..................... 370/252 |
| 7,154,895 B1 * | 12/2006 | Bornemisza et al. ..... 370/395.1 |
| 7,245,633 B1 * | 7/2007 | Mueller ...................... 370/466 |

(Continued)

FOREIGN PATENT DOCUMENTS

JP    2-50648 A    2/1990

(Continued)

OTHER PUBLICATIONS

PPP over SONET/SDH, (See IETF RFC 2615 Specifications, Jun. 1999, IETF), pp. 1-9.

(Continued)

*Primary Examiner*—Ricky Ngo
*Assistant Examiner*—Ben H Liu
(74) *Attorney, Agent, or Firm*—Sughrue Mion, PLLC

(57) ABSTRACT

A transmission system is disclosed that has small circuit scale and small memory capacity, and moreover, in which higher-layer protocol data are transmitted with little transmission delay. A sending device converts the higher-layer protocol data to continuous blocks of a fixed length that is ideal for frames on the transmission path. The sending device next matches the sending rate to the transmission rate of the transmission path by inserting idle blocks between blocks and then transmits. Relay devices receive the blocks and idle blocks from the sending device, and discard the idle blocks to extract the valid blocks. The relay devices further match the sending rate to the transmission rate of the transmission path on the transmission side by inserting idle blocks between the valid blocks and transmit the blocks to a prescribed transfer destination. A receiving device receives the blocks and idle blocks from the final-stage relay device and then discards the idle blocks to extract only the valid blocks. The receiving device finally reconstructs the higher-layer protocol data from the valid blocks.

4 Claims, 10 Drawing Sheets

U.S. PATENT DOCUMENTS

| | | | |
|---|---|---|---|
| 7,266,118 B2* | 9/2007 | Ido et al. | 370/389 |
| 2002/0018475 A1* | 2/2002 | Ofek et al. | 370/400 |
| 2002/0067695 A1* | 6/2002 | Skarpness et al. | 370/230.1 |
| 2003/0081635 A1* | 5/2003 | Ando et al. | 370/528 |
| 2003/0169698 A1* | 9/2003 | Tafazolli et al. | 370/310.1 |
| 2004/0004975 A1* | 1/2004 | Shin et al. | 370/471 |
| 2006/0153150 A1* | 7/2006 | Yang et al. | 370/338 |

FOREIGN PATENT DOCUMENTS

| | | |
|---|---|---|
| JP | 10-79736 A | 3/1998 |
| JP | 10-145434 A | 5/1998 |
| JP | 10-262015 A | 9/1998 |
| JP | 11-252203 A | 9/1999 |
| JP | 11-317739 A | 11/1999 |
| JP | 2000-278318 A | 10/2000 |

OTHER PUBLICATIONS

GFP (Generic Framing Procedure: see ITU-T G, 7041 Specification, Dec. 2001, ITU-T), pp. 1-56.

PPP in HDLC-like Framing, (HDLC-like frames, IETF RFC 1662 Specifications, Jul. 1994, pp. 1-23.

Fibre Channel Physical and Signaling Interface (FC-PH), ANSI X3.320—199x, Rev. 4.3, Jun. 1, 1994, pp. 1-478.

SBCON Single-Byte Command Code Sets CONnection architecture, (SBCON), ANSI X3.296-199 Specifications, Sep. 30, 1996, pp. 1-244.

* cited by examiner

Fig. 6

| type | meaning |
|---|---|
| 00000 | higher-layer protocol frame (tail/16 octets valid) |
| 00001 | higher-layer protocol frame (tail/1 octets valid) |
| 00010 | higher-layer protocol frame (tail/2 octets valid) |
| 00011 | higher-layer protocol frame (tail/3 octets valid) |
| 00100 | higher-layer protocol frame (tail/4 octets valid) |
| 00101 | higher-layer protocol frame (tail/5 octets valid) |
| 00110 | higher-layer protocol frame (tail/6 octets valid) |
| 00111 | higher-layer protocol frame (tail/7 octets valid) |
| 01000 | higher-layer protocol frame (tail/8 octets valid) |
| 01001 | higher-layer protocol frame (tail/9 octets valid) |
| 01010 | higher-layer protocol frame (tail/10 octets valid) |
| 01011 | higher-layer protocol frame (tail/11 octets valid) |
| 01100 | higher-layer protocol frame (tail/12 octets valid) |
| 01101 | higher-layer protocol frame (tail/13 octets valid) |
| 01110 | higher-layer protocol frame (tail/14 octets valid) |
| 01111 | higher-layer protocol frame (tail/15 octets valid) |
| 10000 | higher-layer protocol frame (middle) |
| 10001 | higher-layer protocol frame (head) |

Fig. 8

| 8B/10B code | 128B/133B code |
|---|---|
| D0.0 | 0 0000 0000 |
| D0.1 | 0 0010 0000 |
| D0.2 | 0 0100 0000 |
| ⋮ | ⋮ |
| D31.6 | 0 1101 1111 |
| D31.7 | 0 1111 1111 |
| K28.0 | 1 **** 0000 |
| K28.1 | 1 **** 0001 |
| K28.2 | 1 **** 0010 |
| K28.3 | 1 **** 0011 |
| K28.4 | 1 **** 0100 |
| K28.5 | 1 **** 0101 |
| K28.6 | 1 **** 0110 |
| K28.7 | 1 **** 0111 |
| K23.7 | 1 **** 1000 |
| K27.7 | 1 **** 1001 |
| K29.7 | 1 **** 1010 |
| K30.7 | 1 **** 1011 |
| others | 1 **** 1100 |

*: Don't care

TRANSMISSION SYSTEM FOR EFFICIENT TRANSMISSION OF PROTOCOL DATA

BACKGROUND OF THE INVENTION

1. Field of the Invention

The present invention relates to a transport network, and more particularly to an asynchronous transport network for transmitting higher-layer protocol data.

2. Description of the Related Art

In recent years, technology has been come into practical use for encapsulating data of a higher-layer protocol (hereinbelow, referred to as "higher-layer protocol data") such as Media Access Control (MAC) frames on Ethernet and transmitting the data on a transport network. This type of technology corresponds to, for example, PPP over SONET (see IETF RFC 2615 Specifications, June 1999, IETF) or GFP (Generic Framing Procedure: See ITU-T G. 7041 Specifications, December 2001, ITU-T).

However, the above-described prior art has a number of problems. For example, the transmission of higher-layer protocol data without any loss on a transport network that is realized by the GFP or PPP-over-SONET technology requires that the transmission devices that make up the asynchronous transport network have both the capability for this transmission and a great processing capacity.

In a transmission device that transfers a signal that has been received from one device to another device in an asynchronous transport network, the speed of the received signal is not necessarily equal to the speed of the transmitted signal. The transmission device must therefore be provided with means for converting the signal speed.

For example, when transferring a signal (GFP frames) in which higher-layer protocol data have been encapsulated by GFP technology, the transmission device adjusts the average signal speed by expanding and shrinking the space between GFP frames. The transmission device similarly adjusts the signal speed when transferring a signal (HDLC-like frames (refer to IETF RFC 1662 specifications)) that has been encapsulated by PPP-over-SONET technology.

In both GFP and PPP, however, the functions of the protocol are not capable of interrupting the transfer of frames and then subsequently restarting. In order to adjust the spacing between frames, a transmission device must therefore recognize the boundary between frames, temporarily store for each frame, and then transmit at appropriate timing.

In other words, the transmission device must be provided with the capability of detecting the boundaries of frames from the received signal. In the case of GFP, for example, the transmission device requires a circuit for establishing frame synchronization, and the circuit scale is accordingly increased.

The transmission device further requires a frame buffer for storing frames. In particular, when handling the so-called jumbo frames having a length that exceeds 8 kilobytes, the transmission device requires a large frame buffer having a large memory capacity that can store jumbo frames. Temporarily storing such a long frame also entails an increase in the frame processing delay in the transmission device.

SUMMARY OF THE INVENTION

It is an object of the present invention to provide a transmission system and data transfer method having reduced circuit scale and memory capacity, and further, that enable a decrease in the transmission delay of frames.

To realize the above-described object, the transmission system of the present invention includes a sending device, at least one stage of relay devices, and a receiving device. The sending device converts the higher-layer protocol data to continuous blocks of a fixed length, inserts idle blocks between the blocks to match the sending rate to the transmission rate of the transmission path, and transmits. The relay device receives the blocks and idle blocks, discards these idle blocks to extract only the valid blocks, and then inserts idle blocks between the valid blocks to match the sending rate to the transmission rate of the transmission path on the transmission side and transmits to a prescribed transfer destination. The receiving device receives the blocks and idle blocks from the relay device of the final stage, discards these idle blocks to extract only the valid blocks, and reconstructs the higher-layer protocol data from the valid blocks.

In this regard, the sending device may also generate 18-byte blocks by converting the higher-layer protocol data to a length of 133 bits in accordance with prescribed rules and then adding supplementary information. In this case, the receiving device, after extracting only the valid blocks, removes the supplementary information from these blocks to restore the length of 133 bits, and finally, reconstructs the higher-layer protocol data in accordance with prescribed rules. In addition, the sending device, relay devices, and receiving device. may also send signals by SONET protocol.

When the higher-layer protocol data takes the form of frames, the sending device may, if the length of the frames is not an integer multiple of 16 octets, add null data to the tail of frames to convert the frame length to an integer multiple of 16 octets, and then divide the higher-layer protocol data into units of 16 octets, add five bits of type information to each unit indicating the position of that unit in the higher-layer protocol data, and thus convert to a 133 bit length. In this case, the receiving device may reconstruct the higher-layer protocol data by means of a conversion that is the reverse of the conversion in the transmission device. In such a case, the higher-layer protocol may be Ethernet.

Alternatively, when the higher-layer protocol data takes the form of 8B/10B code, the sending device may convert to the previously described blocks having a length of 133 bits by fetching data portions of 8 bits for data code, and for control code, representing control information by 4 bits and then adding 4 bits of information indicating the position of the next control code to establish 8 bits, and finally, by adding five bits of information indicating the position of the next control code that is added to the header of every 16 codes. In this case, the receiving device may reconstruct the higher-layer protocol data by means of a conversion that is the reverse of the conversion in the transmission device.

The above and other objects, features, and advantages of the present invention will become apparent from the following description with reference to the accompanying drawings, which illustrate examples of the present invention.

BRIEF DESCRIPTION OF THE DRAWINGS

FIG. 6 is a chart showing each of the types of code of a core block and their meanings (classifications);

FIG. 8 is a chart showing the correlation between 8B/10B code and 128B/133B code;

DETAILED DESCRIPTION OF THE PREFERRED EMBODIMENTS

An embodiment of the present invention is next described in detail with reference to the accompanying figures.

In the transport network of the present embodiment, transparent transmission is realized with decreased delay by means of an inexpensive transmission device by dividing frames or an 8B/10B bitstream into blocks of fixed length and then transmitting while regulating the rate of these blocks.

Figure 1:
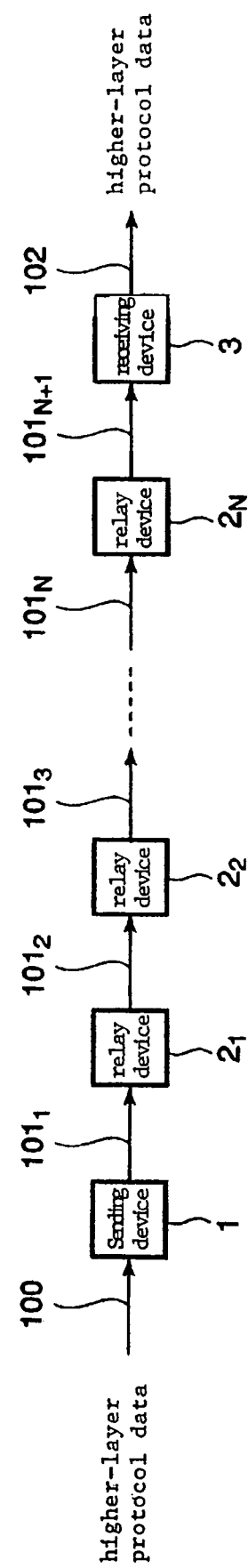
FIG. 1 is a system structure view showing the configuration of a transport network of the present embodiment.

FIG. 1 is a system structure view showing the configuration of the transport network of the present embodiment. Referring to FIG. 1, the transport network of the present embodiment is made up by: sending device 1, N stages of relay devices $2_1 \sim 2_N$, receiving device 3, and the trunk lines $101_1 \sim 101_{N+1}$ that connect these components.

The transport network of the present embodiment is an asynchronous network in which synchronization is not established between transmission devices. However, since a synchronous network in which synchronization is established between transmission devices can be considered as a special case of an asynchronous network, the transport network of the present embodiment may also be a synchronous network. As a result, the transmission rates of trunk lines $101_1 \sim 101_{N+1}$ are not necessarily all the same. SONET may be considered as an example of a transport network.

Sending device 1 receives higher-layer protocol data 100 from devices (hereinbelow referred to as "higher-layer devices") such as switches and routers that are not shown in the figure. Higher-layer protocol data 100 are transmitted from sending device 1 to receiving device 3 by way of relay devices $2_1 \sim 2_N$. Transmitted higher-layer protocol data 100 are then sent from receiving device 3 as higher-layer protocol data 102 to a higher-layer device not shown in the figure. At this time, higher-layer protocol data 100 are transmitted transparently and without loss from one higher-layer device to another higher-layer device.

Higher-layer protocol data 100,102 are in the form of prescribed protocol frames or an 8B/10B bitstream. Ethernet (IEEE 802.3 Specifications), PPP (IETF RFC 1661 Specifications), fiber channel (ANSI X3.230 Specifications), SBCON (ANSI X3.296 Specifications), and DVB-ASI (ETSI (CENELEC) EN 50083-9 Specifications) can be considered as protocols of higher-layer protocol data 100,102.

Sending device 1 transmits higher-layer protocol data 100 that have been received from a higher-layer device to trunk line $101_1$.

Trunk lines $101_1 \sim 101_{N+1}$ are lines for transmitting higher-layer protocol data 100 from transmission device 1 to receiving device 3.

Trunk line $101_1$ connects sending device 1 and relay device $2_1$, and trunk line $101_{N+1}$ connects relay device $2_N$ and receiving device 3. Trunk line $101_M$ ($2 \leq M \leq N$) connects relay device $2_{M-1}$ and relay device $2_M$. Physical media and transmission rate of trunk line $101_1 \sim 101_{N+1}$ may be independent of each other. Relay device $2_M (1 \leq M \leq N)$ converts physical media and transmission rate between trunk lines $2_M$ and $2_{M+1}$.

Receiving device 3 supplies higher-layer protocol data 102 that has been received from trunk line $101_{N+1}$ to a higher-layer device.

Figure 2:
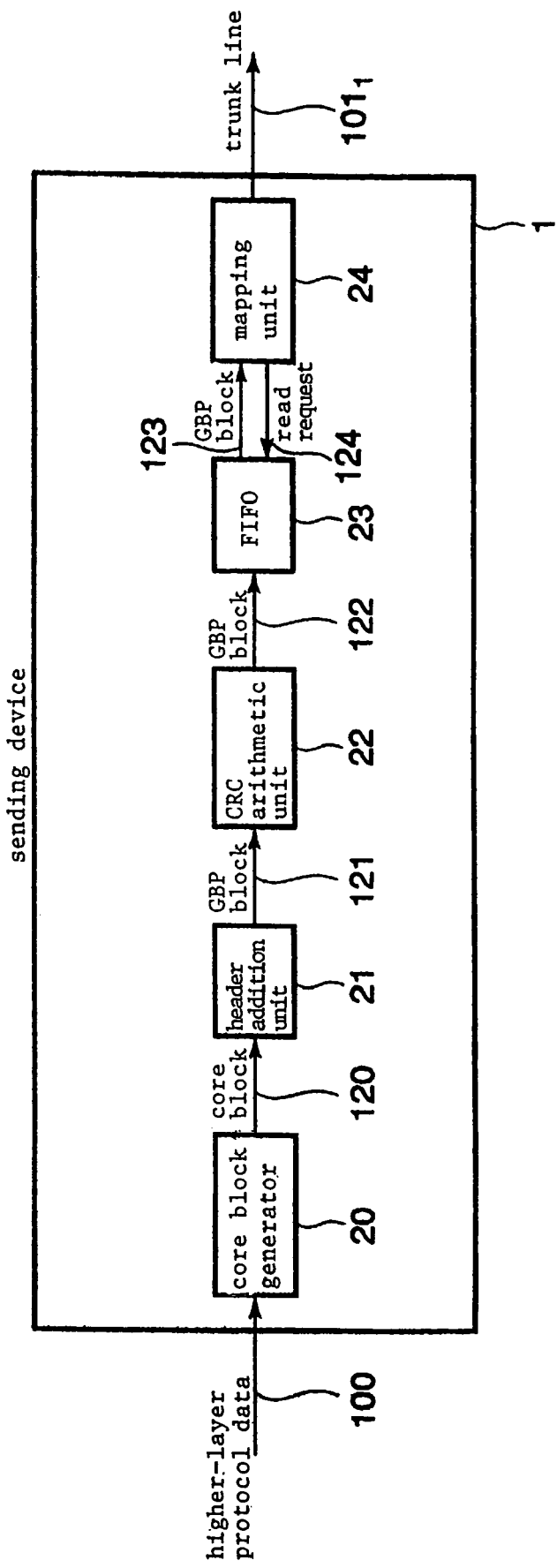
FIG. 2 is a block diagram showing the construction of a sending device.

FIG. 2 is a block diagram showing the construction of a sending device. Referring to FIG. 2, sending device 1 includes: core block generator 20, header addition unit 21, CRC arithmetic unit 22, FIFO 23, and mapping unit 24.

Core block generator 20 either divides or converts higher-layer protocol data 100 into blocks of a fixed length and sends these blocks as core blocks 120 to header addition unit 21.

Header addition unit 21 confers transport headers to the heads of core blocks 120 and sends the blocks as GBP blocks 121 to CRC arithmetic unit 22. The transport headers are headers that are referred to by relay devices $2_1 \sim 2_N$. GBP blocks are novel in this embodiment, and are general blocks of fixed length that are used within the transport network. The length of GBP blocks is 18 bytes.

CRC arithmetic unit 22 performs a CRC operation for GBP blocks 121, adds the obtained CRC value to the tail of GBP blocks 121, and sends the result as GBP blocks 122 to FIFO 23.

FIFO 23 is a First-In/First-Out memory for storing GBP blocks 122. If one or more GBP blocks 122 are stored in memory when read request 124 is issued from mapping unit 24, FIFO 23 sends the leading GBP block as GBP block 123 to mapping unit 24.

On the other hand, if no GBP blocks 122 are present in memory when read request 124 is issued, FIFO 23 sends an idle GBP block as GBP block 123 to mapping unit 24 in response to read request 124. Idle GBP blocks are empty GBP blocks that do not contain higher-layer protocol data and are inserted for regulating rate.

Mapping unit 24 determines whether a signal can be transmitted on trunk line $101_1$, and if transmission is possible, issues read request 124 to FIFO 23, and sends GBP blocks 123 that have been read from FIFO 23 to trunk line $101_1$.

In SONET, for example, trunk line $101_1$ is in a state that does not allow transmission of signals when overhead is being transmitted, but trunk line $101_1$ is in a state that allows transmission of a signal when a payload is being transmitted. Accordingly, read request 124 is issued from mapping unit 24 when payload is being transmitted.

Figure 3:
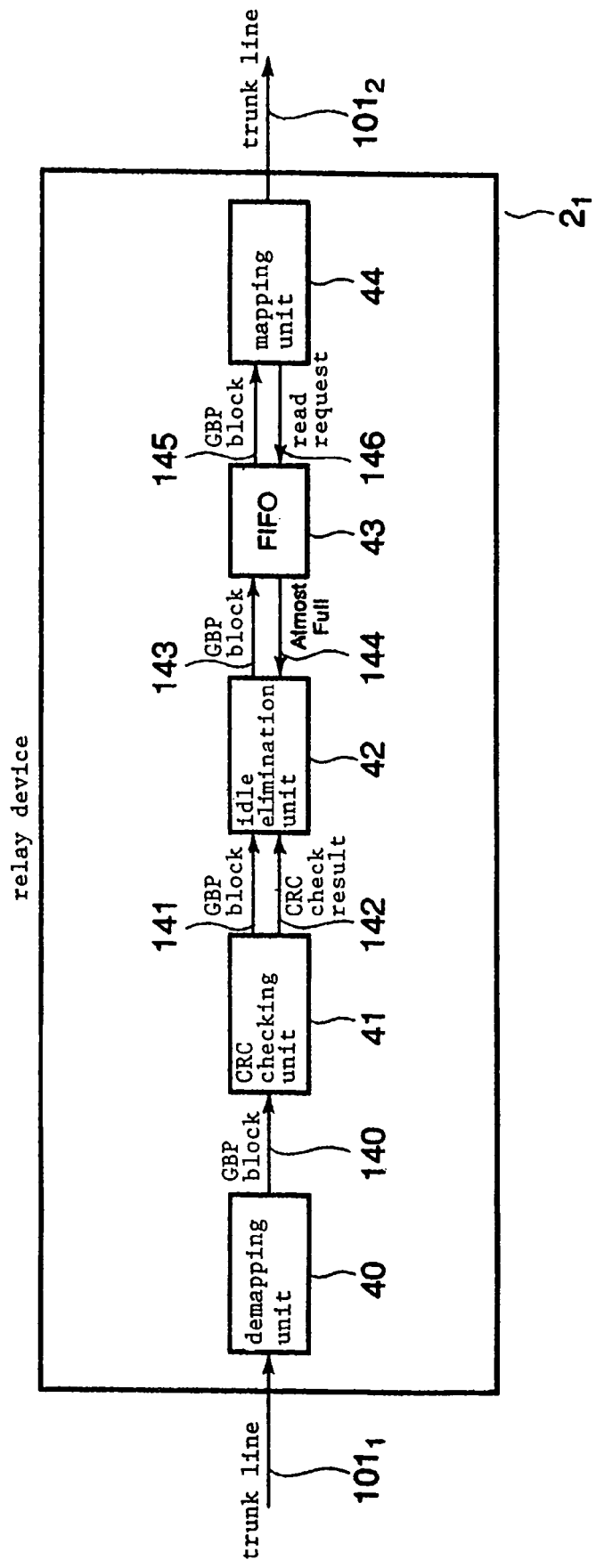
FIG. 3 is a block diagram showing the construction of a relay device.

FIG. 3 is a block diagram showing the construction of a relay device. Relay devices $2_1 \sim 2_{N+1}$ shown in FIG. 1 all have the same construction, and relay device $2_1$ is therefore explained as a representative example.

Referring to FIG. 3, relay device $2_1$ includes: demapping unit 40, CRC checking unit 41, idle elimination unit 42, FIFO 43, and mapping unit 44.

Demapping unit 40 receives GBP blocks from trunk line $101_1$ and sends the blocks as GBP blocks 140 to CRC checking unit 41. The GBP blocks are arranged in fixed positions with respect to the frames of the transport network. For example, if the transport network is a SONET of a prescribed hierarchy level or higher, the size of the payload of the SONET frames is a multiple of 18 bytes, and GBP blocks are accommodated without gaps or wasted space in the payload. Thus, if demapping unit 40 establishes synchronization of the frames of the transport network, the GBP blocks can be easily extracted from within the frames.

CRC checking unit 41 uses the CRC value that has been added to the tail of GBP blocks 140 to check for the presence of bit errors in GBP blocks 140. CRC checking unit 41 then sends CRC check results 142 to idle elimination unit 42 to report the presence or absence of bit errors. Regardless of the presence or absence of bit errors, CRC checking unit 41 also sends GBP blocks 140 that have been received from demapping unit 40 without alteration to idle elimination unit 42 as GBP blocks 141.

Idle elimination unit 42 determines whether GBP blocks 141 are idle GBP blocks or not. If GBP blocks 141 are idle GBP blocks, idle elimination unit 42 discards these GBP blocks 141. In addition, idle elimination unit 42 also determines whether "Almost Full" flag 144, which indicates that the amount of empty capacity in the memory FIFO 43 is limited, i.e., that the empty capacity falls below a prescribed threshold value, has been set by FIFO 43. If "Almost Full" flag 143 has been set, idle elimination unit 42 discards GBP blocks 141 in which bit errors have been detected by CRC checking unit 41. GBP blocks 141 that are not discarded are sent to FIFO 43 as GBP blocks 143.

FIFO 43 is a First-In/First-Out memory for storing GBP blocks 143. If one or more GBP blocks 143 are stored in memory when read request 146 is issued from mapping unit 44, FIFO 43 reads the leading GBP block and sends it to mapping unit 44 as GBP block 145.

If not one GBP block 143 exists in memory when read request 146 is issued, FIFO 43 sends an idle GBP block as GBP block 145 to mapping unit 44 in response to this read request 146.

FIFO 43 also monitors the empty capacity of memory, and sets "Almost Full" flag 144 indicating little empty capacity in the memory when the empty capacity decreases past a prescribed threshold value.

Mapping unit 44 determines whether or not a signal can be transmitted on trunk line $101_2$, and if transmission is possible, issues read request 146 to FIFO 43 and transmits GBP blocks 145 that have been read from FIFO 43 to trunk line $101_2$.

Figure 4:
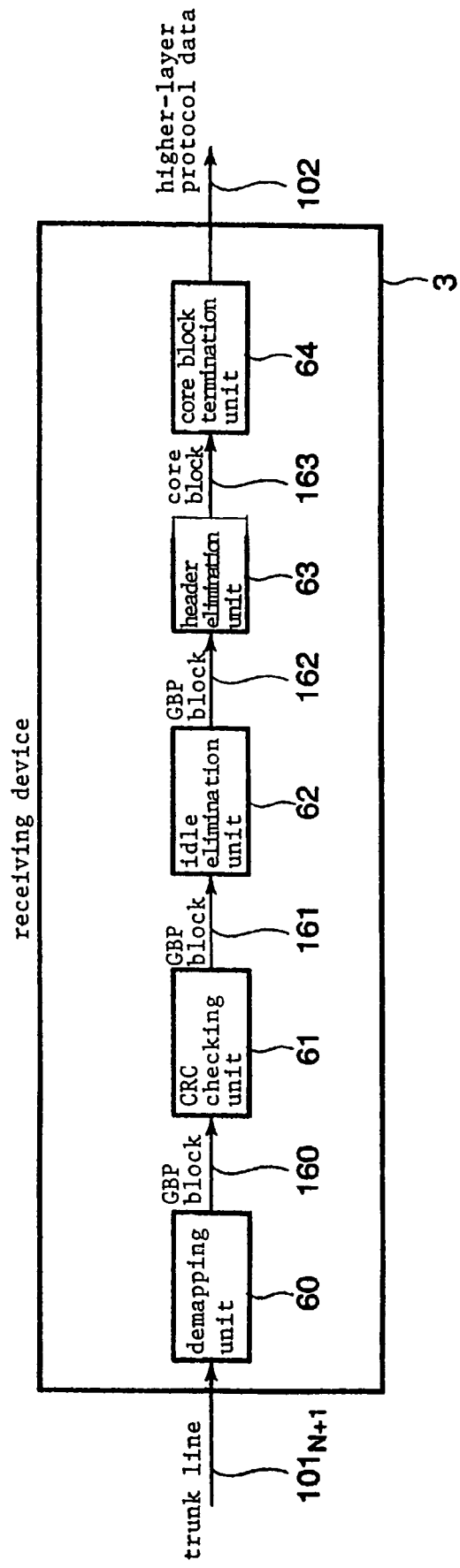
FIG. 4 is a block diagram showing the construction of a receiving device.

FIG. 4 is a block diagram showing the construction of a receiving device. Referring to FIG. 4, receiving device 3 includes: demapping unit 60, CRC checking unit 61, idle elimination unit 62, header elimination unit 63, and core block termination unit 64.

Demapping unit 60 receives GBP blocks from trunk line $101_{N+1}$ and sends the received blocks to CRC checking unit 61 as GBP blocks 160.

CRC checking unit 61 uses the CRC value that has been added to the tail of GBP blocks 160 that have been received from demapping unit 60 to check for bit errors in GBP blocks 160. If bit errors are detected, CRC checking unit 61 discards the GBP blocks 160. If bit errors are not detected, CRC checking unit 61 sends the GBP blocks 160 to idle elimination unit 62 as GBP blocks 161.

Idle elimination unit 62 determines whether or not GBP blocks 161 that have been received from CRC checking unit 61 are idle GBP blocks. If GBP blocks 161 are idle GBP blocks, idle elimination unit 62 discards these GBP blocks 161. On the other hand, if GBP blocks 161 are not idle GBP blocks, idle elimination unit 62 sends these GBP blocks 161 to header elimination unit 63 as GBP blocks 162.

Header elimination unit 63 eliminates the transport header and CRC value from GBP blocks 162 that have been received from GBP idle elimination unit 62 and sends the GBP blocks to core block termination unit 64 as core blocks 163.

Core block termination unit 64 uses type information of each core block 163 to recover higher-layer protocol data 102 from core blocks 163 and sends higher-layer protocol data 102 that has been recovered to a higher-layer device.

Explanation next regards the operation of transmission device 1.

Transmission device 1 first converts higher-layer protocol data 100 to core blocks 120 in core block generator 20.

Figure 5:
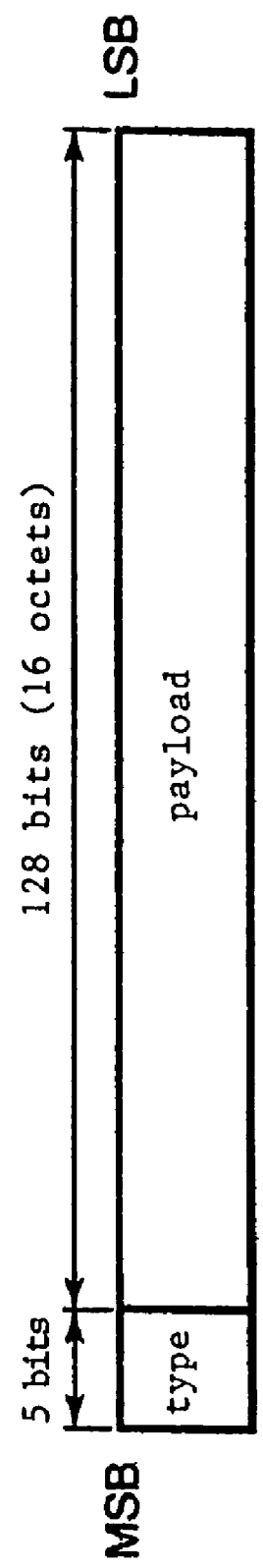
FIG. 5 shows the format of a core block.

FIG. 5 shows the format of the core blocks. Referring to FIG. 5, core blocks have a length of 133 bits. The five most significant bits are a "type" field. The 128 least significant bits (which comprise 16 octets) are the "payload" field.

The "type" field indicates the type of the core block. The "payload" field accommodates the higher-layer protocol data.

The higher-layer protocol data take the form of an 8B/10B bitstream or frames of a prescribed protocol. The method of generating core blocks from the higher-layer protocol data differs according to the format of the higher-layer protocol data. Explanation will be presented of the core block generation method both for a case in which the higher-layer protocol data take the form of frames and for a case in which the higher-layer protocol data take the form of an 8B/10B bitstream.

Explanation first regards a case in which the higher-layer protocol data take the form of frames (hereinbelow, referred to as "higher-layer protocol frames").

Core block generator 20 first divides the higher-layer protocol frames into 16 octets. The data of the 16 divided octets are accommodated in the payload of each core block.

When the length (octet units) of the higher-layer protocol frames is not a multiple of 16, core block generator 20 adds null data to the tail of the higher-layer protocol frames to make the frame length a multiple of 16. The null data that are added at this time are at least one octet and at most 15 octets.

Core block generator 20 next determines the type of the core blocks.

FIG. 6 is a chart showing the each of the types of code of core blocks and their meanings.

The type of core block that includes the head of the higher-layer protocol frame is "higher-layer protocol frame (head)," and the type is "10001" (a binary number). There are 16 types of core blocks including the tails of the higher-layer protocol frames, and these types differ according to the amount of valid data. For example, when the length of the higher-layer protocol frames is (16×N+3) octets (where N is a natural number), the type of the tail core block is "higher-layer protocol frame (tail/3 octets valid)," and the type is "00011" (a binary number). The classification of core blocks that do not include the head and tail of higher-layer protocol frames is the "higher-layer protocol frame (middle)," and this type is "10000 (binary number)."

Figure 7:
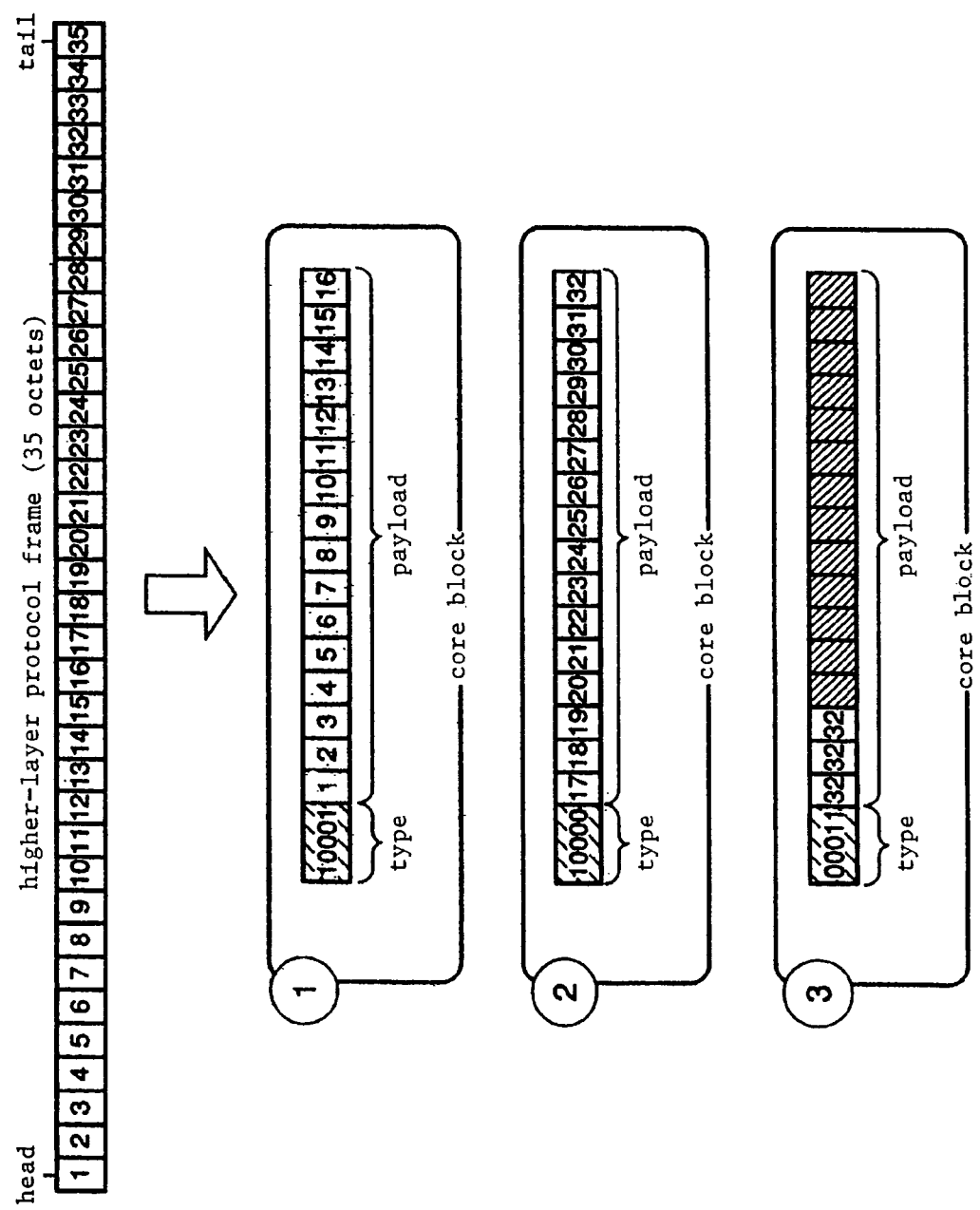
FIG. 7 is a figure for explaining the conversion of a higher-layer protocol frame having a length of 35 octets to three core blocks.

Regarding a specific example, FIG. 7 is an explanatory view showing the state when converting higher-layer protocol frames having a length of 35 octets to three core blocks.

Thirteen octets of null data are first added to the tail of the higher-layer protocol frame such that the frame length becomes a multiple of 16. The higher-layer protocol frames are next divided into 3 groups of 16 octets each.

A first core block is then generated in which data from the head of the higher-layer protocol frame to the 16th octet are set as the payload and type field "10001" is added before this payload. A core block is next generated in which the 17th to 32nd octets are the payload and the type field "10000" is added before this payload, following which a core block is generated in which the 33rd to 35th octets and the 13 octets of null data are the payload and the type field "00011" is added before this payload.

When the higher-layer protocol data take the form of frames, core blocks are generated as described above.

Next, regarding the method of generating core blocks when the higher-layer protocol data take the form of an 8B/10B bitstream, core block generator 20 first performs 8B/10B decoding of the 8B/10B bitstream, and the decoded 8B/10B code is then converted to 128B/133B code. The 128B/133B code has a 9-bit length, and 256 types of data code and 16 types of special code are defined.

FIG. 8 is a chart showing the correlation between 8B/10B code after decoding and 128B/133B code.

A "0" as the most significant bit of 128B/133B code indicates that this 128B/133B code is data code and that the next 8 least significant bits are data. A "1" as the most significant bit of the 128B/133B code indicates that this 128B/133B code is special code and the 4 least significant bits indicate the classification of the special code.

Core block generator 20 next carries out 128B/133B encoding for the 16 128B/133B codes that continue in a time series order and generates a 133B block of 133 bits.

Figure 9:
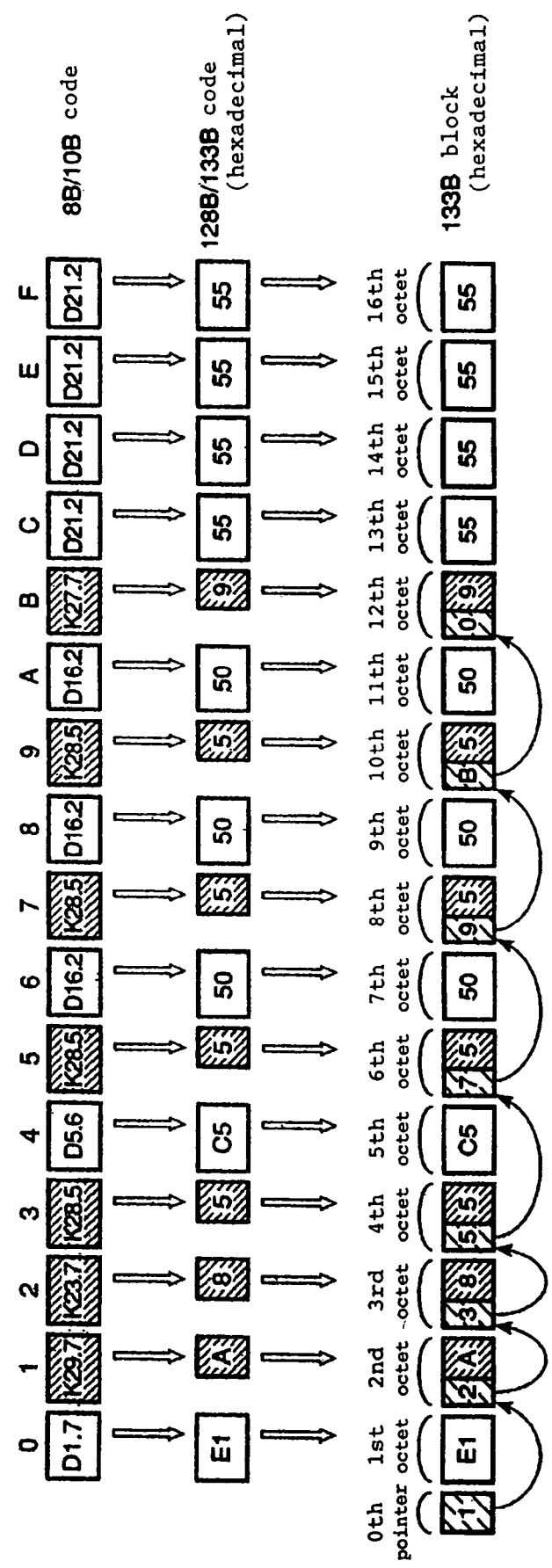
FIG. 9 shows an example of processing for encoding to 128B/133B.

Regarding the details of the 128B/133B encoding, FIG. 9 shows an example of the process of 128B/133B encoding.

The 133B block that is shown in the lower section of FIG. 9 is made up by a data string of 133 bits. The 5 most significant bits of the 133B block are the "0th pointer." The 128 least significant bits of the 133B block are divided into groups of 8 bits each, and numbered from the most significant octet as the "first octet," "second octet," and so on until the "sixteenth octet."

The first 128B/133B code before 128B/133B encoding that is shown in the middle section of FIG. 9 corresponds to the first octet, and the second 128B/133B code corresponds to the second octet. The same is true of the subsequent code up to the sixteenth octet. The 128B/133B code includes 128B/133B data code and 128B/133B special code. In the middle section of FIG. 9, the data of the 8 least significant bits of 128B/133B data code are indicated by two-digit hexadecimal numbers, and the 4 least significant bits of 128B/133B special code are indicated by single-digit hexadecimal number.

The octets of the 133B blocks that correspond to the 128B/133B data code accommodate the 8 least significant bits of the 128B/133B data code. The octets of the 133B blocks that correspond to the 128B/133B special code are further divided into two areas. The 4 least significant bits of the octet accommodate the 4 least significant bits (special code) of 128B/133B special code. The 4 most significant bits of the octet are referred to as the "Nth pointer." Here, N is the ordinal number of the octet. For example, the 4 most significant bits of the third octet are the "Third pointer."

The values of the 0th to 16th pointers are determined by the order of appearance of the 128B/133B data code and special code.

Next, regarding the algorithm for determining the values of 0th-16th pointers. If Mth 128B/133B code before 128B/133B encoding is special code, function C(M) ($1 \leq M \leq 16$) is true. On the other hand, if Mth 128B/133B code is data code, function C(M) is false.

And,
| | | |
|---|---|---|
| IF | C (1) is true, THEN 0th pointer ← 0 | |
| ELSE IF | C (2) is true, THEN 0th pointer ← 1 | |
| ELSE IF | C (3) is true, THEN 0th pointer ← 2 | |
| ELSE IF | C (4) is true, THEN 0th pointer ← 3 | |
| [The intervening lines are omitted] | | |
| ELSE IF | C (14) is true, THEN 0th pointer ← 13 | |
| ELSE IF | C (15) is true, THEN 0th pointer ← 14 | |
| ELSE IF | C (16) is true, THEN 0th pointer ← 15 | |
| ELSE | 0th pointer ← 16 | |
| IF | C (1) is true, THEN | |
| BEGIN | | |
| IF | C (2) is true, THEN 1st pointer ← 1 | |
| ELSE IF | C (3) is true, THEN 1st pointer ← 2 | |
| ELSE IF | C (4) is true, THEN 1st pointer ← 3 | |
| [The intervening lines are omitted] | | |
| ELSE IF | C (15) is true, THEN 1st pointer ← 14 | |
| ELSE IF | C (16) is true, THEN 1st pointer ← 15 | |
| ELSE | 1st pointer ← 0 | |
| END | | |
| IF | C (2), THEN | |
| BEGIN | | |
| IF | C (3) is true, THEN 2nd pointer ← 2 | |
| ELSE IF | C (4) is true, THEN 2nd pointer ← 3 | |
| ELSE IF | C (5) is true, THEN 2nd pointer ← 4 | |
| [The intervening lines are omitted] | | |
| ELSE IF | C (15) is true, THEN 2nd pointer ← 14 | |
| ELSE IF | C (16) is true, THEN 2nd pointer ← 15 | |
| ELSE | 2nd pointer ← 0 | |
| END | | |
| [Cases for C (3) to C (13) are omitted.] | | |
| IF | C (14) is true, THEN | |
| BEGIN | | |
| IF | C (15) is true, THEN 14th pointer ← 14 | |
| ELSE IF | C (16) is true, THEN 14th pointer ← 15 | |
| ELSE | 14th pointer ← 0 | |
| END | | |
| IF | C (15) is true, THEN | |
| BEGIN | | |
| IF | C (16) is true, THEN 15th pointer ← 15 | |
| ELSE | 15th pointer ← 0 | |
| END | | |
| IF | C (16) is true, THEN 16th pointer ← 0 | |

The 0th pointer indicates the position of the oldest in time series order (i.e., the closest) special code in the 16 128B/133B codes before 128B/133B encoding. When the value of the 0th pointer is "0," the first octet corresponds to 128B/133B special code. When the value of the 0th pointer is "1," the first octet corresponds to 128B/133B data code and the second octet corresponds to 128B/133B special code. When the value of the 0th pointer is "2," the first and second octets correspond to 128B/133B data code, and the third octet corresponds to 128B/133B special code. The same holds true for succeeding values of the 0th pointer, but a value of 16 for the 0th pointer indicates that all 16 128B/133B codes are data code.

The Nth pointer($1 \leq N \leq 15$) indicates the position of the oldest in time series order special code in the 128B/133B codes from (N+1)th to 16th before 128B/133B encoding.

For example, when the value of the 2nd pointer is "3," 3rd octet corresponds to 128B/133B data code, and the 4th octet corresponds to 128B/133B special code. When the value of the Nth pointer($1 \leq N \leq 15$) is "0," all the 128B/133B codes from (N+1)th to 16th are data code. The value of 16th pointer is "0" at any time.

As can be clearly understood from the above-described algorithm, the list configuration of 128B/133B special code is formed by the 0th to 16th pointers.

Core block generator 20 next stores 133B blocks in core blocks without alteration. The 5 most significant bits (i.e., the 0th pointer) of the 133B blocks correspond to the type of the core block. In addition, the 128 least significant bits (i.e., the first to sixteenth octets) of the 133B blocks correspond to the payload of the core blocks.

The headers of core blocks 120 that have been generated by core block generator 20 are conferred transport headers in header addition unit 21 and are sent as GBP blocks 121 to CRC arithmetic unit 22.

Figure 10:
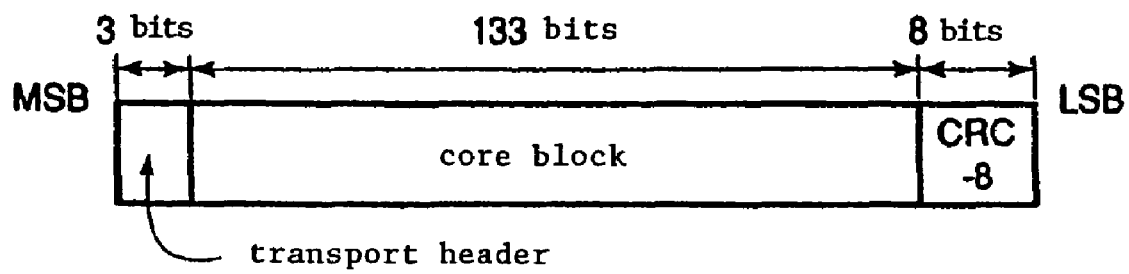
FIG. 10 shows the format of a GBP block.

Regarding the details of the GBP blocks and transport headers, FIG. 10 shows the format of GBP blocks. Referring to FIG. 10, GBP blocks have a length of 144 bits (i.e., 18 octets), the three most significant bits from the first to third bits are a "transport header" field, the 133 bits from the fourth to the 136th bits are the "core block" field, and the 8 bits from the 137th to the 144th bits are the "CRC-8" field.

Figure 11:
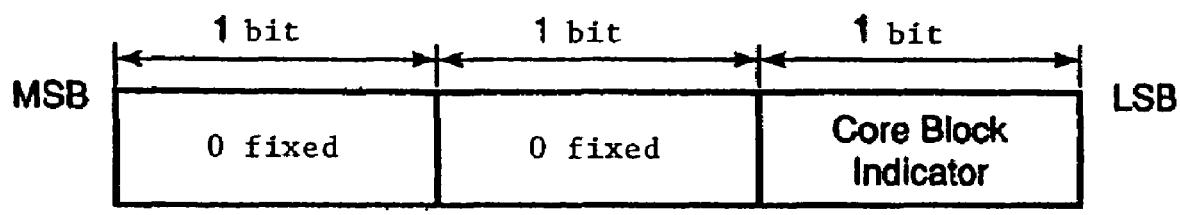
FIG. 11 shows the format of a transport header.

FIG. 11 shows the format of a transport header. Referring to FIG. 11, the two most significant bits of the transport header are unused and have the fixed value "0." The least significant bit is the "Core Block Indicator." The Core Block Indicator (hereinbelow abbreviated as "CBI") is a flag for indicating the validity or nullity of a core block. When the CBI is "1," the core block is valid, and when CBI is "0," the core block is null. In other words, a GBP block for which the CBI is "0" is an idle GBP block and is used for rate regulation.

CRC-8 is used for detecting bit errors in the overall GBP block. The generation polynomial of this CRC is:

$$x^8+x^7+x^6+x^5+x^2+x+1$$

CRC arithmetic unit 22 performs a CRC operation for the transport headers and core blocks of GBP blocks 121. CRC arithmetic unit 22 then sends GBP blocks in which the CRC values of the operation results have been substituted in the "CRC-8" field to FIFO 23 as GBP blocks 122.

GBP blocks 122 are written to FIFO 23. If one or more GBP blocks 122 are stored in FIFO 23 when read request 124 is issued from mapping unit 24, the GBP blocks 122 are read and supplied as GBP blocks 123. If not one GBP block 122 is stored in FIFO 23, idle GBP blocks are supplied as GBP blocks 123.

Mapping unit 24 determines whether or not a signal can be transmitted to trunk line $101_1$, and if transmission is possible, issues read request 124 to FIFO 23, and transmits GBP blocks 123 that have been read to trunk line $101_1$.

Explanation next regards the operation of relay devices $2_1$~$2_N$. The operation of relay devices $2_2$~$2_N$ is the same as that for relay device $2_1$, and explanation is therefore limited to the operation of relay device $2_1$ that is shown in FIG. 3 as a representative example.

GBP blocks 140 that have been extracted from trunk line $101_1$ by mapping unit 40 are sent to CRC checking unit 41 where the absence or presence of bit errors is checked. The absence or presence of bit errors is sent as CRC check results 142 to idle elimination unit 42. CRC check results 142 are used for determining whether or not GBP blocks can be eliminated in idle elimination unit 42. Regardless of the absence or presence of bit errors, GBP blocks 140 are sent to idle elimination unit 42 as GBP blocks 141.

Explanation next regards operations for absorbing rate differences on trunk line $101_1$ and trunk line $101_2$.

Idle elimination unit 42, which has received GBP blocks 141 from CRC checking unit 41, discards these GBP blocks 141 if GBP blocks 141 are idle GBP blocks and further, if no bit errors are present. Alternatively, when "Almost Full" flag 144, which indicates that there is little empty capacity in FIFO 43, has been set, idle elimination unit 42 discards GBP blocks 141 if there are bit errors in GBP blocks 141 that have been received from CRC checking unit 41. GBP blocks 141 that are not discarded are written to FIFO 43 as GBP blocks 143.

If one or more GBP blocks 143 are stored in FIFO 43 when read request 146 is issued from mapping unit 44, GBP blocks 143 are read from FIFO 43 and sent to mapping unit 44 as GBP blocks 145. If no GBP blocks 143 are stored in FIFO 43, idle GBP blocks are sent to mapping unit 44 as GBP blocks 145 in response to read request 146.

Mapping unit 44 determines whether signals can be transmitted to trunk line $101_2$, and if transmission is possible, issues read request 146 to FIFO 43. GBP blocks 145 that have been read and sent from FIFO 43 are then transmitted to trunk line $101_2$.

Explanation next regards the operation of receiving device 3.

GBP blocks 160 that are received from trunk line $101_{N+1}$ and extracted by demapping unit 60 are sent to CRC checking unit 61, where they are examined for bit errors. If bit errors are detected, these GBP blocks 160 are discarded. If bit errors are not detected, GBP blocks 160 are sent to idle elimination unit 62 as GBP blocks 161.

Idle GBP blocks that are included in GBP blocks 161 from CRC checking unit 61 are discarded by GBP idle elimination unit 62. GBP blocks 161 that are not discarded are sent as GBP blocks 162 to header elimination unit 63, where the transport headers and CRC values are removed to produce core blocks 163. Core blocks 163 are sent to core block termination unit 64, where they are restored to higher-layer protocol data 102.

Thus, the conversion of higher-layer protocol data to GBP blocks of fixed length and the transmission of these GBP blocks by sending device 1, and the insertion and elimination of idle GBP blocks at any time by transmission devices (relay devices $2_1$~$2_N$) that are positioned midway on the transmission path according to the transport network of the present embodiment as described in the foregoing explanation can eliminate the need for frame buffers for rate conversion at each device, allows a reduction in the amount of memory in the transmission devices (sending device 1, relay devices $2_1$~$2_N$, and receiving device 3) that constitute an asynchronous transport network, and enables a decrease in delay within the transfer devices.

According to the transport network of the present embodiment, moreover, GBP blocks that are transmitted by the transport network are of a fixed length and transmission devices that are positioned midway on the transmission path can therefore easily fetch GBP blocks by synchronizing the frames of transport network, whereby the circuit scale of the transfer devices can be reduced. Still further, the transport network can be, for example, SONET.

In addition, according to the transport network of the present embodiment, the length of GBP blocks is 18 bytes and therefore can be mapped without gaps in the payload of SONET frames, thereby eliminating waste.

Further, according to the transport network of the present embodiment, the payload of the GBP blocks is as short as 16 bytes, whereby waste areas that occur in the payload are limited to a maximum of 15 bytes. The total of two bytes of overhead in the GBP blocks adequately accommodate information such as the bits for rate regulation as well as redundant code for bit error detection. As a result, adopting a GBP block length of 18 bytes simultaneously enables both high transfer efficiency and high reliability.

When the higher-layer protocol is Ethernet, the 16-byte payload of the GBP blocks may result in the occurrence of waste areas of a maximum of 15 bytes in the payload, but because the minimum spacing of MAC frames according to specifications is 20 bytes, the 15 bytes of waste areas are cancelled by the 20 bytes of spacing of the MAC frames, and waste is thus eliminated.

In addition, the transport network of the present embodiment provides a construction that converts to blocks not only frame-based protocol (such as Ethernet, PPP) but also protocols that employ 8B/10B transmission path code (such as fiber channels and DVB-ASI), and thus can be applied to wide range of higher-layer protocols.

While preferred embodiments of the present invention have been described using specific terms, such description is for illustrative purposes only, and it is to be understood that changes and variations may be made without departing from the spirit or scope of the following claims.

What is claimed is:

1. A transmission system, comprising:
   a sending device for converting higher-layer protocol data to continuous blocks of a fixed length, inserting idle blocks between said continuous blocks to match the sending rate to the transmission rate of the transmission line, and transmitting;
   at least one stage of relay devices for receiving said continuous blocks and said idle blocks, discarding these idle blocks and continuous blocks containing bit errors to extract only valid continuous blocks, and then inserting idle blocks between said valid continuous blocks to match the sending rate to the transmission rate of the transmission line on a transmission side and transmitting to a prescribed transfer destination; and
   a receiving device for receiving said continuous blocks and said idle blocks from said relay device of a final stage, discarding these idle blocks and continuous blocks containing bit errors to extract only valid continuous blocks, and reconstructing said higher-layer protocol data from said valid continuous blocks,
   wherein when said higher-layer protocol data takes the form of frames, said sending device converts said frames to a fixed length by adding null data to tail portions of said frames to make the frame length an integer multiple of a specified length if the length of said frames is not an integer multiple of the specified length, dividing said higher-layer protocol data into units of the specified length, and adding to each unit of specified length a specified number of bits of type information indicating the position of that unit within said higher-layer protocol data,
   said receiving device reconstructs said higher-layer protocol data by performing a conversion that is the reverse of the conversion in said sending device,
   said type information indicates that said unit of specified length contains one of higher-layer protocol data comprising a head portion of a higher-layer protocol frame, higher-layer protocol data comprising a middle portion of a higher-layer protocol frame, and higher-layer protocol data comprising a tail portion of a higher-layer protocol frame, and
   said type information indicating said higher-layer protocol data comprising said tail portion of a higher-layer protocol frame comprises a plurality of type information corresponding to an amount of valid data in said tail portion.

2. A transmission system wherein higher-layer protocol data takes the form of 8B/10B code, said transmission system comprising:
   a sending device for converting higher-layer protocol data to continuous blocks of a fixed length, inserting idle blocks between said continuous blocks to match the sending rate to the transmission rate of the transmission line, and transmitting;
   at least one stage of relay devices for receiving said continuous blocks and said idle blocks, discarding these idle blocks and continuous blocks containing bit errors to extract only valid continuous blocks, and then inserting idle blocks between said valid continuous blocks to match the sending rate to the transmission rate of the transmission line on a transmission side and transmitting to a prescribed transfer destination; and
   a receiving device for receiving said continuous blocks and said idle blocks from said relay device of the final stage, discarding these idle blocks and continuous blocks containing bit errors to extract only valid continuous blocks, and reconstructing said higher-layer protocol data from said valid continuous blocks,
   wherein said sending device converts said 8B/10B code to said blocks having a length of 133 bits by, for data code, fetching data portions of 8 bits, and for control code, representing control information by 4 bits and adding 4 bits of information indicating the position of the next control code, resulting in 8 bits, and, adding five bits of information indicating the position of the next control code to the header of every 16 codes, and
   said receiving device reconstructs said higher-layer protocol data by performing a conversion that is the reverse of the conversion in said sending device.

3. A data transfer method for transmitting higher-layer protocol data in a transmission system that includes a sending device, at least one stage of relay devices, and a receiving device; said data transfer method comprising:
   in said sending device:
   converting higher-layer protocol data to continuous blocks having a fixed length; and
   matching sending rate to the transmission rate of the transmission path by inserting idle blocks between said continuous blocks having a fixed length and transmitting;
   in said relay device:
   receiving said continuous blocks having a fixed length and said idle blocks from said sending device;
   discarding the idle blocks and continuous blocks having a fixed length containing bit errors and extracting only said continuous blocks having a fixed length that are valid; and
   matching the sending rate to the transmission rate in the transmission path by inserting idle blocks between said continuous blocks having a fixed length that are valid and transmitting to a prescribed transfer destination;
   and in said receiving device:
   receiving said continuous blocks having a fixed length and said idle blocks from a final stage relay device;
   discarding said idle blocks and continuous blocks having a fixed length containing bit errors and extracting only continuous blocks having a fixed length that are valid; and
   reconstructing said higher-layer protocol data from said continuous blocks having a fixed length that are valid,
   wherein when said higher-layer protocol data takes the form of frames, said sending device converts said frames to a fixed length by adding null data to tail portions of said frames to make the frame length an integer multiple of a specified length if the length of said frames is not an integer multiple of the specified length, dividing said higher-layer protocol data into units of the specified length, and adding to each unit of specified length a specified number of bits of type information indicating the position of that unit within said higher-layer protocol data,
   said receiving device reconstructs said higher-layer protocol data by performing a conversion that is the reverse of the conversion in said sending device,
   said type information indicates that said unit of specified length contains one of higher-layer protocol data comprising a head portion of a higher-layer protocol frame, higher-layer protocol data comprising a middle portion of a higher-layer protocol frame, and higher-layer protocol data comprising a tail portion of a higher-layer protocol frame, and said type information indicating said higher-layer protocol data comprising said tail portion of a higher-layer protocol frame comprises a plurality of type information corresponding to an amount of valid data in said tail portion.

4. A transmission method, comprising:

convening higher-layer protocol data to continuous blocks of a fixed length, inserting idle blocks between said continuous blocks to match the sending rate to the transmission rate of the transmission line, and transmitting;

receiving said continuous blocks and said idle blocks at a relay device, discarding these idle blocks and continuous blocks containing bit errors to extract only valid continuous blocks, and then inserting idle blocks between said valid continuous blocks to match the sending rate to the transmission rate of the transmission line on a transmission side and transmitting to a prescribed transfer destination; and receiving said continuous blocks and said idle blocks from said relay device of a final stage, discarding these idle blocks and continuous blocks containing bit errors to extract only valid continuous blocks, and reconstructing said higher-layer protocol data from said valid continuous blocks, wherein said converting higher-layer protocol data to continuous blocks of a fixed length comprises converting 8B/10B code to said blocks having a length of 133 bits by, for data code, fetching data portions of 8 bits, and for control code, representing control information by 4 bits and adding 4 bits of information indicating the position of the next control code, resulting in 8 bits, and, adding five bits of information indicating the position of the next control code to the header of every 16 codes, and wherein said receiving said continuous blocks and said idle blocks from said relay device of a final stage comprises reconstructing said higher-layer protocol data by performing a conversion that is the reverse of the conversion in said sending device.

* * * * *

UNITED STATES PATENT AND TRADEMARK OFFICE
CERTIFICATE OF CORRECTION

PATENT NO. : 7,522,633 B2  Page 1 of 1
APPLICATION NO. : 10/743375
DATED : April 21, 2009
INVENTOR(S) : Kiyohisa Ichino It is certified that error appears in the above-identified patent and that said Letters Patent is hereby corrected as shown below:

Col. 13 line 7, Claim 4, delete "convening" and insert --converting--

Signed and Sealed this

Twenty-fifth Day of August, 2009

David J. Kappos
*Director of the United States Patent and Trademark Office*